United States Patent
Park et al.

(10) Patent No.: US 11,428,992 B2
(45) Date of Patent: Aug. 30, 2022

(54) METHOD FOR MANUFACTURING LIQUID CRYSTAL ALIGNING FILM

(71) Applicant: LG Chem, Ltd., Seoul (KR)

(72) Inventors: Jeong Ho Park, Daejeon (KR); Bu Gon Shin, Daejeon (KR); Eun Kyu Her, Daejeon (KR)

(73) Assignee: LG Chem, Ltd.

(*) Notice: Subject to any disclaimer, the term of this patent is extended or adjusted under 35 U.S.C. 154(b) by 0 days.

(21) Appl. No.: 16/646,411

(22) PCT Filed: Sep. 21, 2018

(86) PCT No.: PCT/KR2018/011264
§ 371 (c)(1),
(2) Date: Mar. 11, 2020

(87) PCT Pub. No.: WO2019/059720
PCT Pub. Date: Mar. 28, 2019

(65) Prior Publication Data
US 2020/0271975 A1    Aug. 27, 2020

(30) Foreign Application Priority Data
Sep. 25, 2017    (KR) .......................... 10-2017-0123422

(51) Int. Cl.
*G02F 1/1337*    (2006.01)
*B23K 26/0622*    (2014.01)
(Continued)

(52) U.S. Cl.
CPC ...... *G02F 1/13378* (2013.01); *B23K 26/0622* (2015.10); *B23K 26/0626* (2013.01);
(Continued)

(58) Field of Classification Search
CPC .......... G02F 1/13378; G02F 1/133788; G02F 1/133711; G02F 1/133792;
(Continued)

(56) References Cited

U.S. PATENT DOCUMENTS

| 2005/0069815 A1 | 3/2005 | Takeishi et al. |
| 2006/0197899 A1* | 9/2006 | Kamiya .............. H05H 1/2406 349/124 |

(Continued)

FOREIGN PATENT DOCUMENTS

| JP | H02310525 A | 12/1990 |
| JP | H09266234 A | 10/1997 |

(Continued)

OTHER PUBLICATIONS

International Search Report for PCT/KR2018/011264 dated Mar. 21, 2019.
(Continued)

*Primary Examiner* — Ruiyun Zhang
(74) *Attorney, Agent, or Firm* — Lerner, David, Littenberg, Krumholz & Mentlik, LLP

(57) ABSTRACT

A method for manufacturing a liquid crystal aligning film includes preparing a multilayer structure in which a substrate, a conductive layer, a liquid crystal alignment layer, and a passivation film are sequentially provided, etching one area of the liquid crystal alignment layer by irradiating a pulse laser to the multilayer structure, and exposing one area of the conductive layer by removing the passivation film, wherein the pulse laser is irradiated to the liquid crystal alignment layer from the passivation film. The method is compatible with a continuous process.

12 Claims, 13 Drawing Sheets

(51) Int. Cl.
*B23K 26/06* (2014.01)
*B23K 26/362* (2014.01)
*B32B 27/06* (2006.01)
*B32B 37/20* (2006.01)
*B32B 38/10* (2006.01)
*B32B 7/12* (2006.01)
*B32B 38/00* (2006.01)

(52) U.S. Cl.
CPC .......... *B23K 26/362* (2013.01); *B32B 27/06* (2013.01); *B32B 37/203* (2013.01); *B32B 38/10* (2013.01); *G02F 1/133711* (2013.01); *G02F 1/133788* (2013.01); *B32B 7/12* (2013.01); *B32B 2038/0068* (2013.01); *B32B 2310/0843* (2013.01); *B32B 2457/202* (2013.01); *G02F 1/133792* (2021.01)

(58) Field of Classification Search
CPC .......... B23K 26/0622; B23K 26/0626; B23K 26/362; C09K 2323/02; B32B 37/203; B32B 38/10; B32B 7/12; B32B 2310/0834; B32B 2457/202
USPC .................... 428/1.1, 1.2; 264/400
See application file for complete search history.

(56) References Cited

U.S. PATENT DOCUMENTS

| | | |
|---|---|---|
| 2007/0181543 A1 | 8/2007 | Urairi et al. |
| 2008/0018841 A1 | 1/2008 | Rho et al. |
| 2009/0261062 A1 | 10/2009 | Kim |
| 2015/0103298 A1 | 4/2015 | Lee et al. |
| 2016/0052090 A1 | 2/2016 | Tanigawa |

FOREIGN PATENT DOCUMENTS

| | | |
|---|---|---|
| JP | H11223819 A | 8/1999 |
| JP | 2002049039 A | 2/2002 |
| JP | 2003294950 A | 10/2003 |
| JP | 2004184791 A | 7/2004 |
| JP | 2005186109 A | 7/2005 |
| JP | 2006175509 A | 7/2006 |
| JP | 2007212666 A | 8/2007 |
| JP | 2009237444 A | 10/2009 |
| JP | 2015075767 A | 4/2015 |
| JP | 2016043558 A | 4/2016 |
| KR | 20050023560 A | 3/2005 |
| KR | 100624592 B1 | 9/2006 |
| KR | 20080009533 A | 1/2008 |
| KR | 20090052590 A | 5/2009 |
| KR | 101380227 B1 | 4/2014 |
| KR | 101500684 B1 | 3/2015 |
| KR | 101738981 B1 | 5/2017 |

OTHER PUBLICATIONS

Extended European Search Report with Written Opinion for Application No. 18859694.4 dated Jul. 27, 2020, 7 pages.
Newsome, et al., "Laser etched gratings on polymer layers for alignment of liquid crystals," Applied Physics Letters, Apr. 27, 1998, pp. 2078-2080, vol. 72, No. 17, XP012020053.
Chinese Search Report for Application No. 201880061246.6 dated May 18, 2021, pp. 1-3.

\* cited by examiner

[Figure 1]
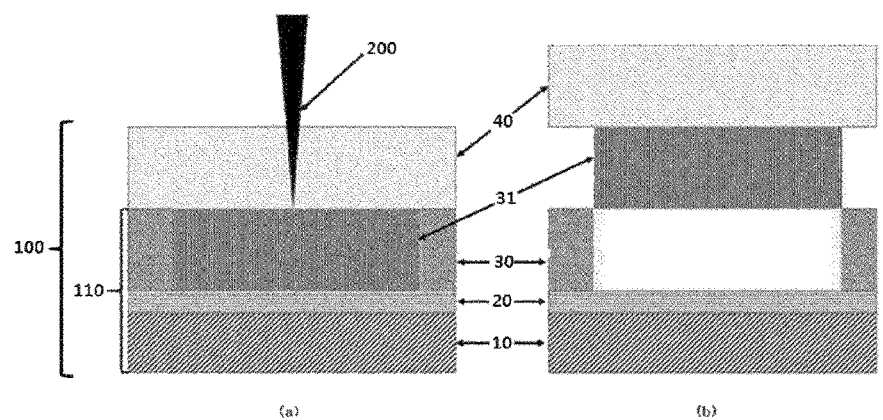

[Figure 2]
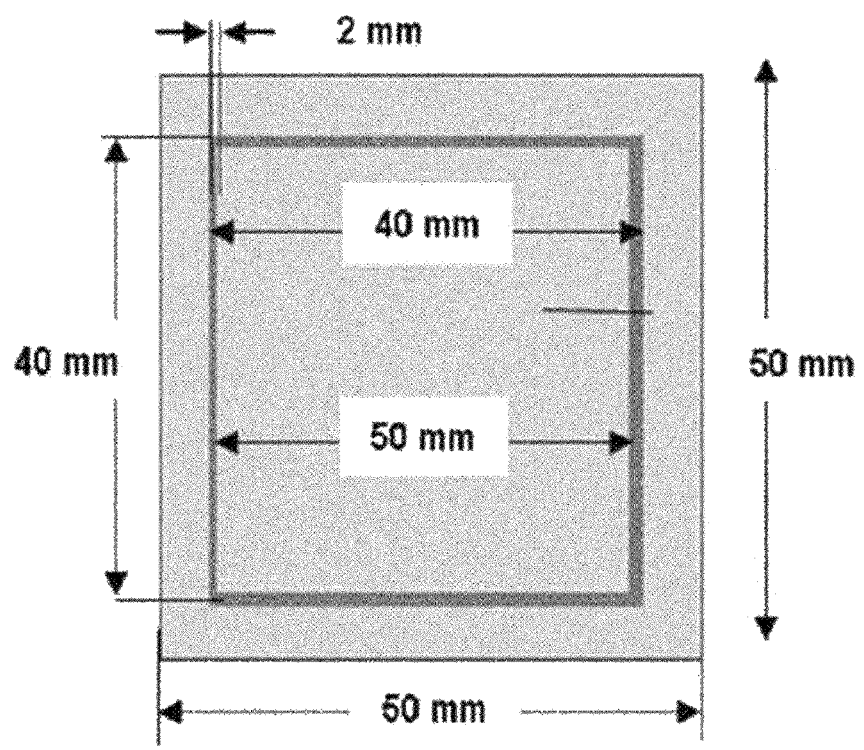

[Figure 3]
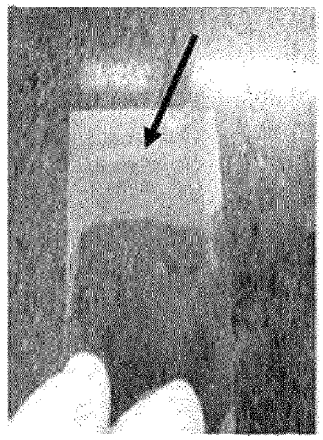
(a)
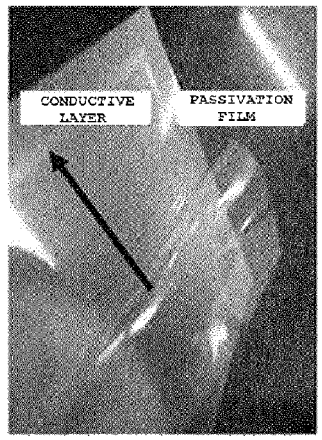
(b)
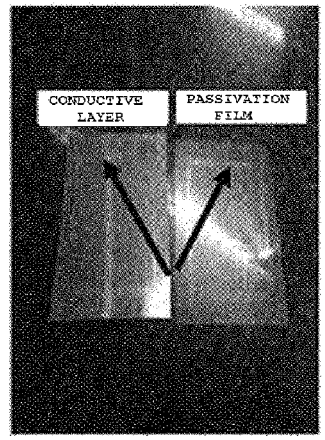
(c)

[Figure 4]
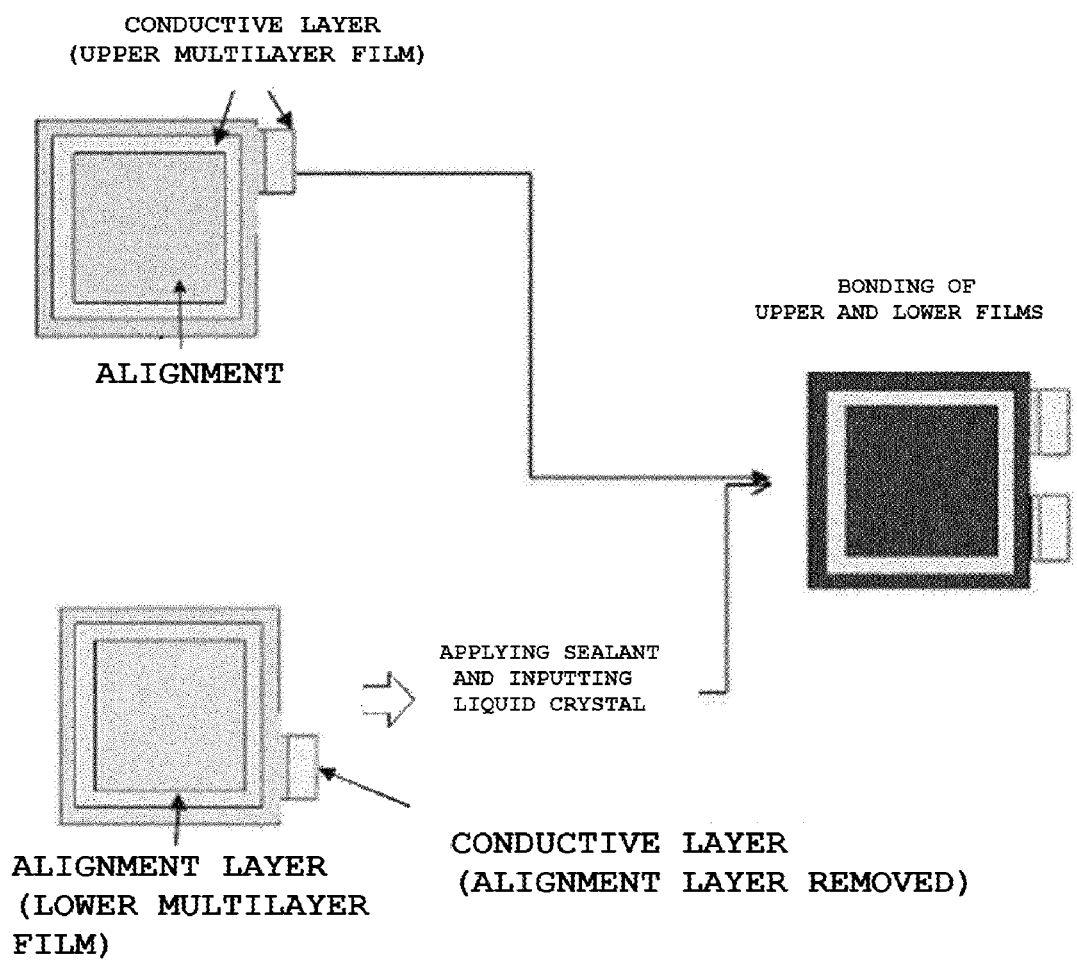

[Figure 5]
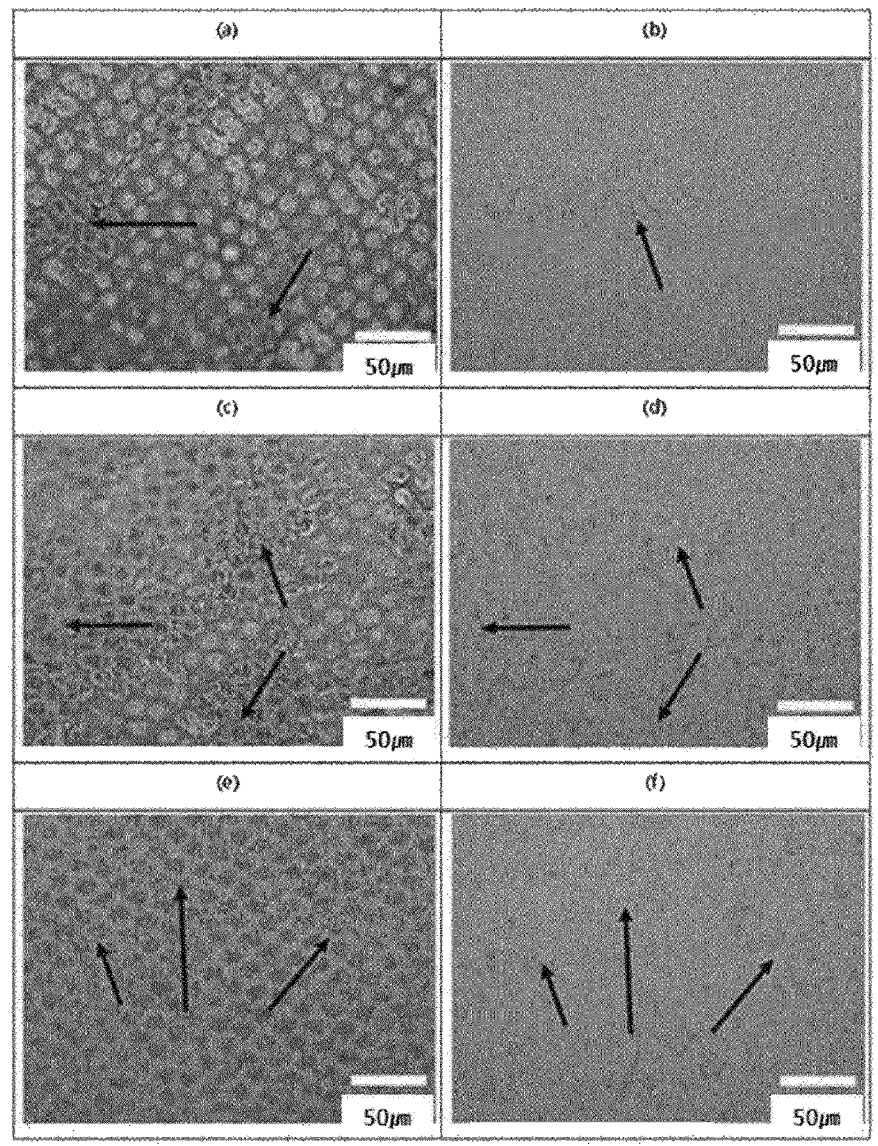

[Figure 6]
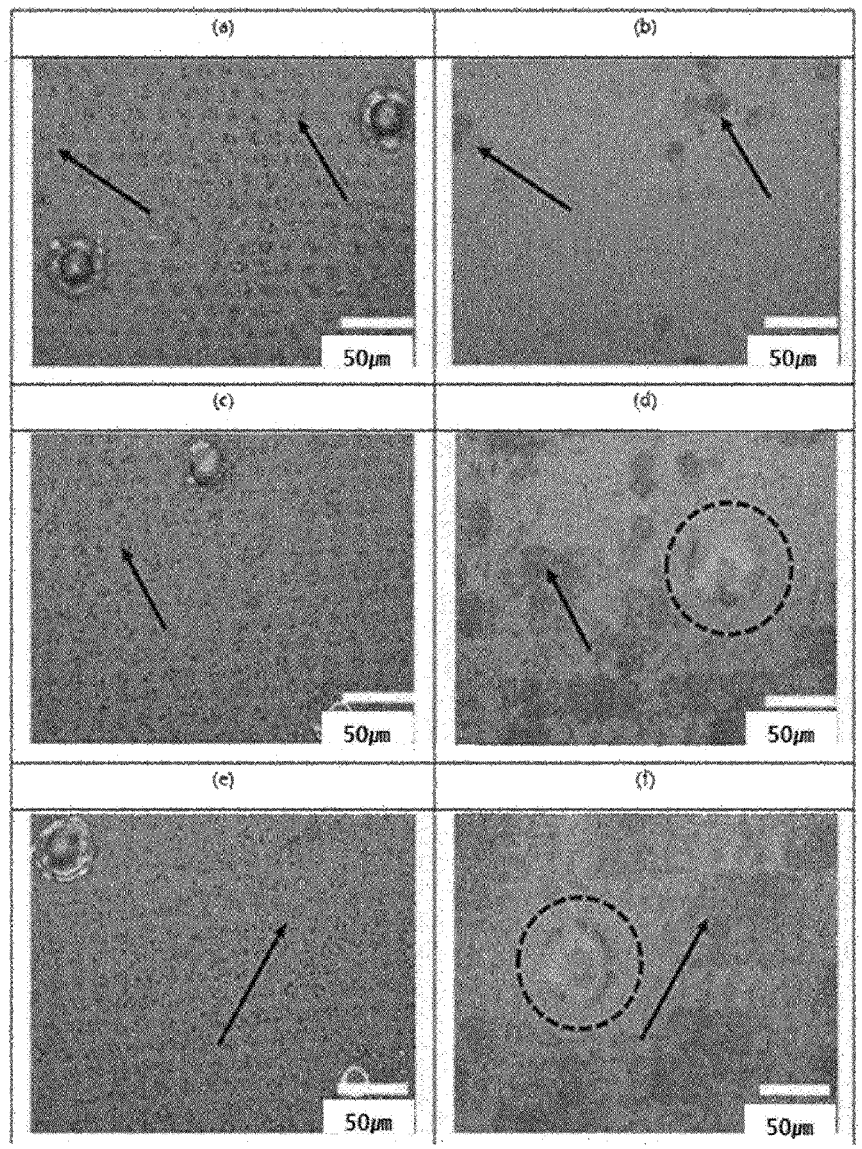

[Figure 7]
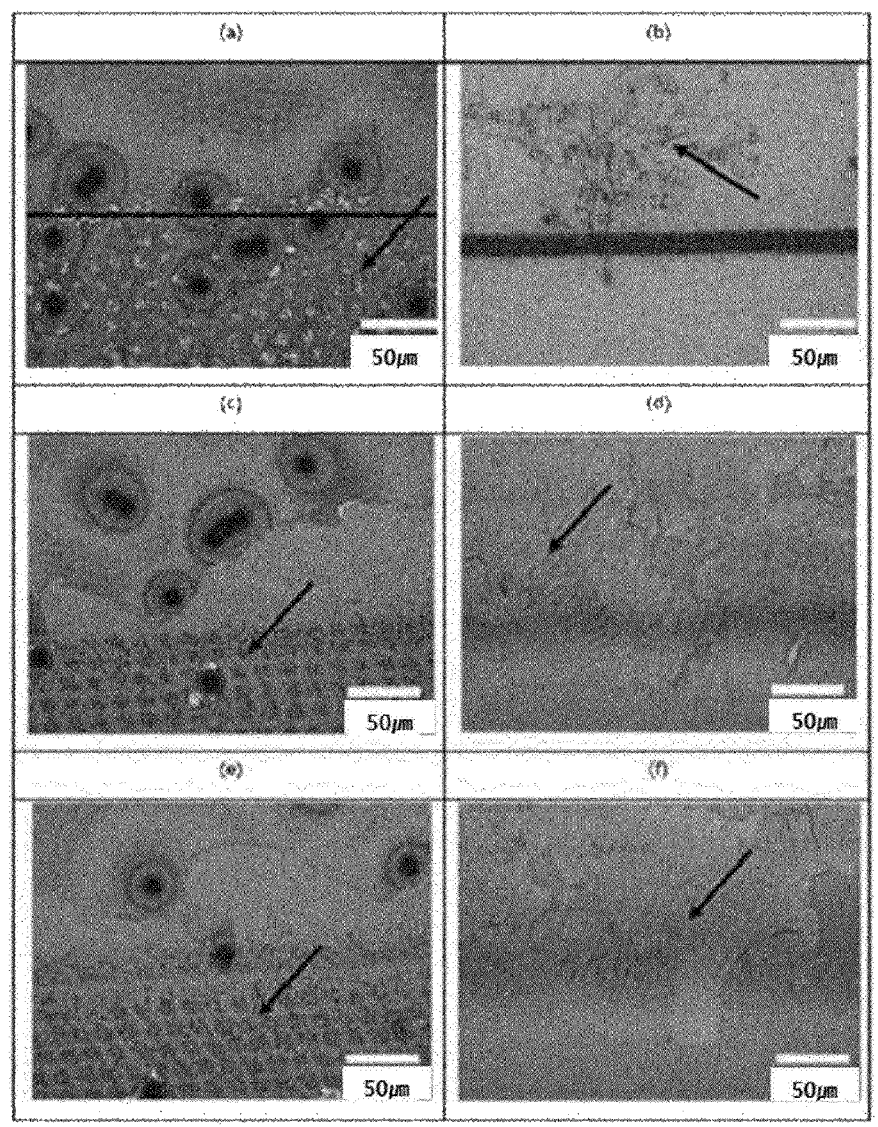

[Figure 8]
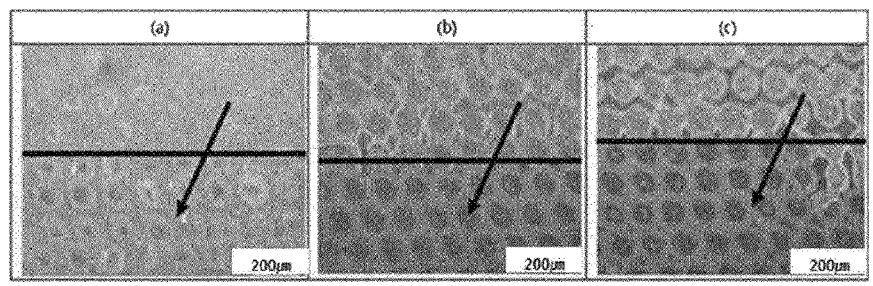

[Figure 9]
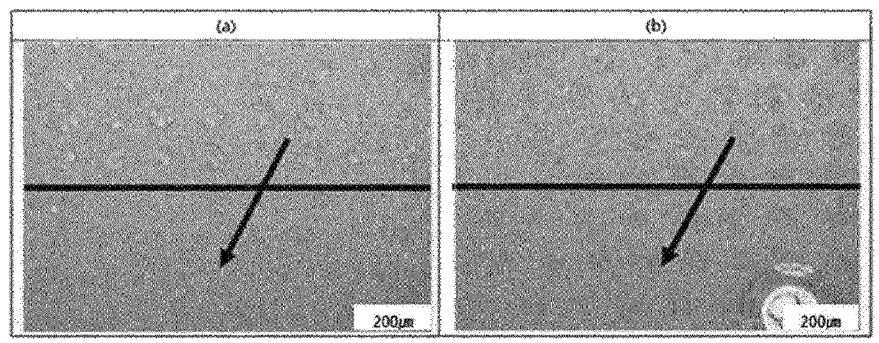

[Figure 10]
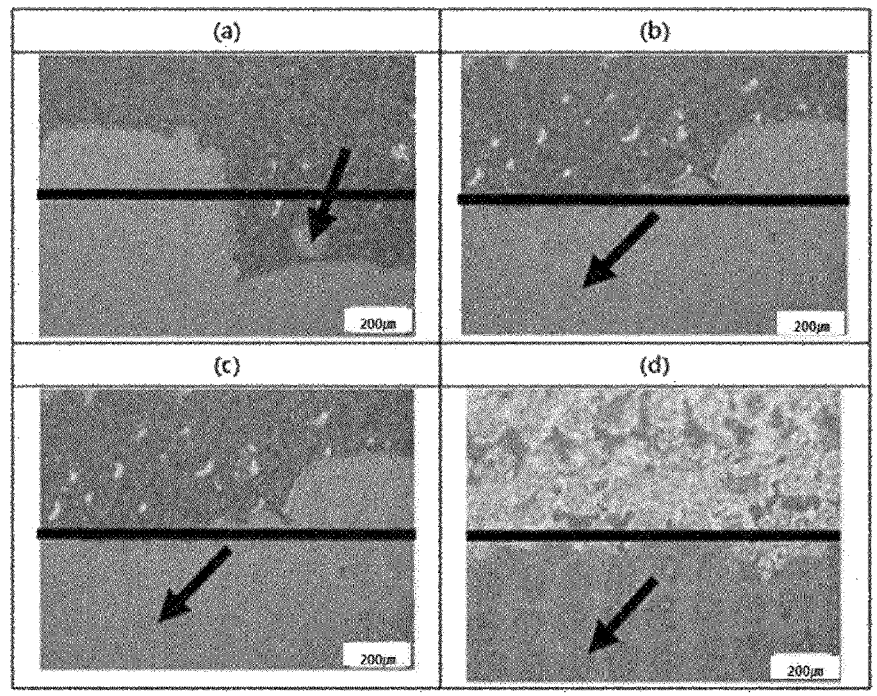

[Figure 11]
(a)
(b)
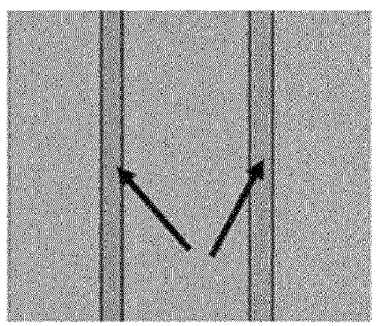
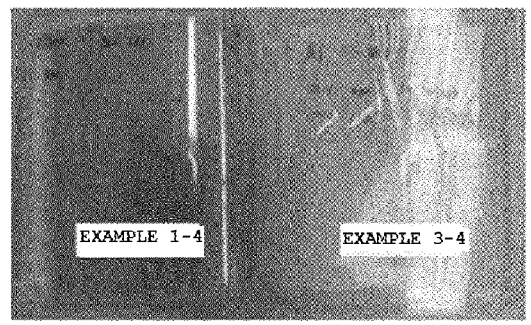

[Figure 12]
(a) 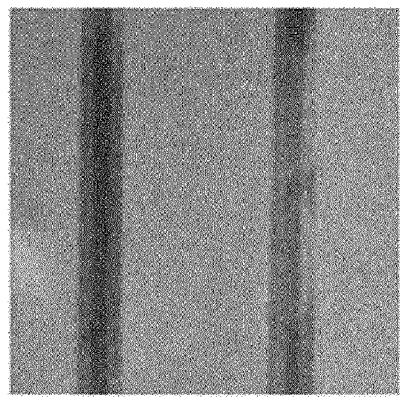　(b) 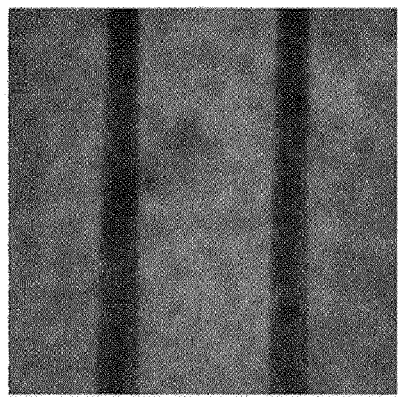

[Figure 13]
(a) 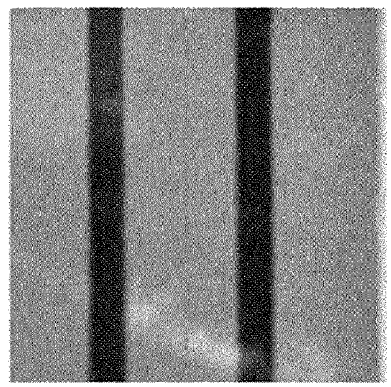   (b) 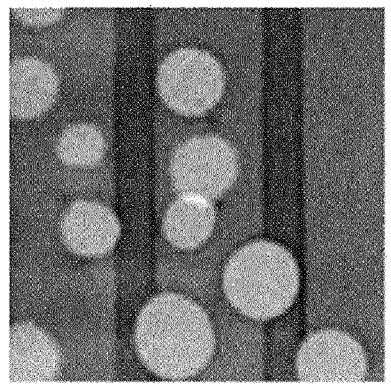

METHOD FOR MANUFACTURING LIQUID CRYSTAL ALIGNING FILM

CROSS-REFERENCE TO RELATED APPLICATION

The present application is a National Phase entry under 35 U.S.C. § 371 of International Application No PCT/KR2018/011264 filed Sep. 21, 2018 which claims priority from Korean Patent Application No. 10-2017-0123422 filed Sep. 25, 2017 with the Korean Intellectual Property Office, the entire contents of which are incorporated herein by reference.

TECHNICAL FIELD

The present invention relates to a method for manufacturing a liquid crystal aligning film.

BACKGROUND ART

Researches on liquid crystal discoloration devices that can be applied to flexible electronic device products such as displays, smart windows, or sunroofs are being progressed.

In particular, a film for the liquid crystal discoloration device has a form of a liquid crystal aligning film in which a conductive layer is provided on an upper portion of a substrate and a dielectric film, a light alignment film having an electrical or electro-optical function, a gap spacer, and the like are provided on upper and lower portions of the conductive layer. In addition, the film for liquid crystal discoloration device provided on the upper and lower portions with respect to liquid crystals are manufactured by an existing roll-to-roll (R2R) based continuous process.

In the conductive layer included in the film for the liquid crystal discoloration device, a metal oxide layer which is transparent and conductive is formed on the upper portion of a substrate film to form an electrical field for controlling alignment of the liquid crystals and block (gas barrier) bubbles generated under a high-temperature and high-humidity condition and the liquid crystal alignment layer may grant an alignment function to the liquid crystals.

Although processes such as electrical short-circuiting and cutting are also important in a step of processing the film for the liquid crystal discoloration device according to a usage of a product, a process of granting adhesion and durability of the film for the liquid crystal discoloration device provided on the upper and lower portions with respect to the liquid crystals is particularly important.

In addition, in order to bond the upper and lower liquid crystal discoloration device films to each other with the liquid crystal as a center, the liquid crystal alignment film should have an excellent adhesive force with a sealant provided between the upper and lower liquid crystal discoloration device films, but when the liquid crystal alignment layer does not have the excellent adhesion strength with the sealant, a process of exposing the conductive layer by selectively removing the liquid crystal alignment layer is additionally required.

This is to utilize not only conductivity of a transparent electrode based on metal oxide included in the conductive layer but also the excellent adhesion property with the sealant and a blocking property of outgassing which may occur in a plastic substrate in a high temperature and high humidity critical environment.

As a method for selectively removing the liquid crystal alignment layer in the related art, wet etching such as treatment of an organic solvent is used, but the wet etching not only hinders efficiency of a continuous process but also has economic and environmental problems due to use of the organic solvent.

Further, in order to enhance the durability of a display device, it is necessary to develop a process that may replace a wet process, considering a recent technical trend requiring curing properties for chemical resistance and high temperature stability for the liquid crystal alignment layer.

In order to solve the problem due to the use of the organic solvent, there was an attempt of a method for forming the liquid crystal alignment layer by using a patterning process such as photolithography, inkjet, slot dye, screen printing, etc., not removing the liquid crystal alignment layer which is already formed.

However, the process of forming the liquid crystal alignment layer has a problem in that the process is not compatible with the roll-to-roll based continuous process. Specifically, the process of forming the liquid crystal alignment layer has a problem in that a price of a manufacturing process facility for ensuring a process facility for implementation of a large area from a small liquid crystal device to a flexible device increases and productivity is lowered.

Therefore, a research on a method for manufacturing a liquid crystal aligning film which may save manufacturing cost by developing a processing process which is simple and is compliant with the roll-to-roll continuous process, specifically, the liquid crystal discoloration device film is required.

PRIOR ART DOCUMENT

Patent Document

Japanese Patent Unexamined Publication No. JP 1997-266234 A

DETAILED DESCRIPTION OF THE INVENTION

Technical Problem

The present invention has been made in an effort to provide to a method for manufacturing a liquid crystal aligning film.

However, the object to be solved by the present invention is not limited to the aforementioned object and other objects, which are not mentioned above, will be apparent to a person having ordinary skill in the art from the following description.

Technical Solution

An embodiment of the present invention provides a method for manufacturing a liquid crystal aligning film, which includes: preparing a multilayer structure in which a substrate, a conductive layer, a liquid crystal alignment layer, and a passivation film are sequentially provided; etching one area of the liquid crystal alignment layer by irradiating a pulse laser to the multilayer structure; and exposing one area of the conductive layer by removing the passivation film, in which the pulse laser is irradiated to the liquid crystal alignment layer from the passivation film.

Advantageous Effects

According to an embodiment of the present invention, there is an advantage in which the embodiment of the present invention is compatible with a roll-to-roll continuous process. Specifically, since an embodiment of the present invention does not accompany a additional process of cleaning an etching residue by using an organic solvent, the embodiment of the present invention is compatible with the continuous process, is environmentally friendly, and is economical.

A liquid crystal aligning film manufactured according to an embodiment of the present invention may provide a liquid crystal discoloration device in which damage of a conductive layer is minimized to maximize blocking characteristics of moisture and/or bubbles depending on a change of an external environment.

The method for manufacturing the liquid crystal aligning film manufactured according to an embodiment of the present invention minimizes a quantity of etched liquid crystal alignment layer residues which exist on the conductive layer.

The liquid crystal aligning film manufactured according to an embodiment of the present invention has high adhesive force with a sealant.

BRIEF DESCRIPTION OF DRAWINGS

FIG. 1 is a schematic view of a method for manufacturing a liquid crystal aligning film according to an embodiment of the present invention.

FIG. 2 is a plan view of a liquid crystal aligning film according to an embodiment of the present invention.

FIG. 3 illustrates a digital camera image of a multilayer structure to which a pulse laser is irradiated, a process of removing a passivation film in the multilayer structure, the liquid crystal aligning film, and the passivation film according to an embodiment of the present invention.

FIG. 4 is a schematic view of a method for manufacturing a liquid crystal discoloration device using a liquid crystal aligning film manufactured according to an embodiment of the present invention.

FIG. 5 illustrates an optical microscope image of the surface of a liquid crystal aligning film and the surface of a passivation film according to Examples 1-1 to 1-3.

FIG. 6 illustrates an optical microscope image of the surface of a liquid crystal aligning film and the surface of a passivation film according to Examples 2-1 to 2-3.

FIG. 7 illustrates an optical microscope image of the surface of a liquid crystal aligning film and the surface of a passivation film according to Examples 3-1 to 3-3.

FIG. 8 illustrates an optical microscope image of the surface of a liquid crystal aligning film according to Comparative Examples 1-2 to 1-4.

FIG. 9 illustrates an optical microscope image of the surface of a liquid crystal aligning film according to Comparative Examples 2-3 and 2-4.

FIG. 10 illustrates an optical microscope image of the surface of a liquid crystal aligning film according to Comparative Examples 3-1 to 3-4.

FIG. 11 illustrates a schematic view of a specimen used in a high temperature/high humidity durability test and a digital camera image thereof.

FIG. 12 illustrates a digital camera image of a high temperature/high humidity durability evaluation result of Examples 1-4 and 3-4.

FIG. 13 illustrates a digital camera image of a high temperature/high humidity durability evaluation result of Comparative Example 4.

BEST MODE

Throughout this specification, it will be understood that when a member is referred to as being "on" another member, it can be directly on the other member or intervening members may also be present.

Throughout this specification, unless explicitly described to the contrary, a case where any part "includes" any component will be understood to imply the inclusion of stated components but not the exclusion of any other component.

Throughout this specification, the term of a degree used "step (of)" or "step of" does not mean "step for".

Hereinafter, this specification will be described in more detail.

An embodiment of the present invention provides a method for manufacturing a liquid crystal aligning film, which includes: preparing a multilayer structure in which a substrate, a conductive layer, a liquid crystal alignment layer, and a passivation film are sequentially provided; etching one area of the liquid crystal alignment layer by irradiating a pulse laser to the multilayer structure; and exposing one area of the conductive layer by removing the passivation film, in which the pulse laser is irradiated to the liquid crystal alignment layer from the passivation film.

Hereinafter, each step of the manufacturing method will be described in detail.

Step of Preparing Multilayer Structure

According to an embodiment of the present invention, the method for manufacturing the liquid crystal aligning film includes a step of preparing a multilayer structure including a substrate, a conductive layer, a liquid crystal alignment layer, and a passivation film which are sequentially provided.

According to an embodiment of the present invention, the multilayer structure may include a substrate. The substrate may be a polymer substrate. Specifically, the polymer substrate may include at least one of polyethylene terephthalate (PET), ethylene vinyl acetate (EVA), cyclic olefin polymer (COP), cyclic olefin copolymer (COC), polyacrylate (PAC), polycarbonate (PC), polyethylene (PE), polymethylmethacrylate (PMMA), polyetheretherketone (PEEK), polyethylenenaphthalate (PEN), polyetherimide (PEI), polyimide (PI), triacetylcellulose (TAC), methyl methacrylate (MMA), and a fluorine resin. However, a type of polymer substrate is not limited and if a polymer having a bending characteristic is known to the art, the polymer may be selected without a limitation.

According to an embodiment of the present invention, the multilayer structure includes the polymer substrate to secure mechanical durability and structural flexibility of the liquid crystal aligning film. Specifically, the multilayer structure includes the polymer substrate to implement the bending characteristic of the liquid crystal aligning film.

According to an embodiment of the present invention, the thickness of the substrate may be 50 μm or more and 200 μm or less, specifically 70 μm or more and 200 μm or less, 50 μm or more and 150 μm or less, or 70 μm or more and 150 μm or less, and more specifically, 90 μm or more and 150 μm or less, 70 μm or more and 110 μm or less, or 90 μm or more and 110 μm or less. The thickness of the substrate is adjusted to the above range to implement both durability and the bending characteristic of the manufactured liquid crystal aligning film.

According to an embodiment of the present invention, the multilayer structure may include the conductive layer provided on the substrate. When the substrate is the polymer substrate, the liquid crystal aligning film may implement both the durability and the structural flexibility. However, since the polymer substrate is generally not low in moisture permeability, moisture and/or bubbles due to a change in external environment are permeated.

On the other hand, according to an embodiment of the present invention, by providing an inorganic-based conductive layer on the substrate of the multilayer structure, electrical conductivity of the liquid crystal aligning film may be secured and blocking characteristics of the moisture and/or the bubbles due to the change in external environment may be easily secured.

Specifically, the conductive layer may form an electric field for controlling alignment of liquid crystals which may be applied onto an upper portion of the liquid crystal alignment layer, may have electrical conductivity, and as a metal oxide layer having higher surface energy, may implement high adhesive force with the sealant. Further, the conductive layer may have a characteristic of blocking the moisture and/or the bubbles due to the change in external environment such as high temperature and high humidity.

According to an embodiment of the present invention, the conductive layer may include at least one of a conductive polymer, a conductive metal, and a conductive metal oxide, and may specifically include at least one of the conductive metal and the conductive metal oxide.

Specifically, the conductive layer may include at least one metal of gold, silver, nickel, copper, and palladium, the metal oxide, or an alloy material. Further, the conductive layer may include at least one of indium tin oxide (ITO), antimony-doped zinc oxide (AZO), antimony-doped tin oxide (ATO), SnO, $RuO_2$, and $IrO_2$. However, the type of material included in the conductive layer is not limited and a material which may block the moisture and/or bubbles, form the electric field for controlling the alignment of the liquid crystals, supply electric charges, and has excellent adhesive force with the sealant may be used without the limitation.

Further, the conductive layer may be provided to have transparency and various materials and forming methods known to the art are applied to implement the conductive layer having transparency.

According to an embodiment of the present invention, the thickness of the conductive layer may be 20 nm or more and 100 nm or less, specifically 30 nm or more and 100 nm or less, 20 nm or more and 80 nm or less, or 30 nm or more and 80 nm or less, and more specifically, 40 nm or more and 80 nm or less, 30 nm or more and 70 nm or less, or 40 nm or more and 70 nm or less. However, the present invention is not limited thereto, and the thickness of the conductive layer may be approximately adjusted according to a condition of a pulse laser irradiated to the multilayer structure.

Since the conductive layer has a thickness much smaller than the thickness of the substrate, a problem may occur in which the conductive layer is damaged may occur during a process of etching the liquid crystal alignment layer which may be provided on the conductive layer. Further, when the conductive layer is damaged, a problem in which the blocking characteristics of the moisture and/or the bubbles of the liquid crystal aligning film are not implemented may occur. Therefore, it is possible that the damage to the conductive layer is minimized to maximize the blocking characteristics of the moisture and/or the bubbles depending on the change in external environment of the liquid crystal aligning film.

Therefore, in the method for manufacturing a liquid crystal aligning film according to an embodiment of the present invention, the passivation film is provided on the upper portion of the liquid crystal alignment layer included in the multilayer structure to minimize the damage to the conductive layer by irradiation of the pulse laser. Therefore, it is possible to effectively prevent the problems from occurring.

According to an embodiment of the present invention, the multilayer structure may include the liquid crystal alignment layer provided on the conductive layer. The liquid crystal alignment layer is provided on the conductive layer to control the alignment of the liquid crystals applied onto the liquid crystal alignment layer.

According to an embodiment of the present invention, the liquid crystal alignment layer may include at least one of an optical alignment layer and a rubbing alignment layer. Further, the liquid crystal alignment layer may be provided in a structure in which the optical alignment layer and the rubbing alignment layer are stacked.

According to an embodiment of the present invention, in the case of the optical alignment layer, it is possible to control the alignment of the liquid crystals which may be applied onto the liquid crystal alignment layer through light irradiation. Further, in the case of the rubbing alignment layer, the alignment of the liquid crystals which may be applied onto the liquid crystal alignment layer may be controlled through a rubbing process of rotating a roller on the liquid crystal alignment layer.

According to an embodiment of the present invention, the optical alignment layer may include a light alignment compound. Further, the light alignment compound may exist in an ordered state so as to have directivity. In addition, the light alignment compound is orientationally ordered through irradiation of light and if the light alignment compound as a compound in which a liquid crystal compound adjacent in the ordered state, etc. may be aligned in a predetermined direction is known to the art, the light alignment compound may be selected without the limitation.

According to an embodiment of the present invention, the rubbing alignment layer may exist in the ordered state so as to have the directivity. In addition, the rubbing alignment layer is orientationally ordered through the rubbing process and if the rubbing alignment layer as a material that may align the liquid crystal compound adjacent in the ordered state, etc. in a predetermined direction is known to the art, the rubbing alignment layer may be included without the limitation.

According to an embodiment of the present invention, the thickness of the liquid crystal alignment layer may be 50 nm or more and 300 nm or less, specifically 70 nm or more and 300 nm or less, 50 nm or more and 200 nm or less, or 70 nm or more and 200 nm or less, and more specifically, 90 nm or more and 200 nm or less, 70 nm or more and 110 nm or less, or 90 nm or more and 110 nm or less. However, the present invention is not limited thereto, and the thickness of the liquid crystal alignment layer may be approximately adjusted according to the condition of the pulse laser irradiated to the multilayer structure.

Since the liquid crystal alignment layer has a thickness relatively smaller than the thickness of the substrate, only when the damage to the conductive layer is minimized during the process of etching the liquid crystal alignment layer through the irradiation of the pulse laser, the blocking characteristics of the moisture and/or the bubbles depending on the change in external environment of the liquid crystal aligning film may be maximized.

As described above, the liquid crystal alignment layer has a problem in that a barrier property of the moisture and/or bubbles of the liquid crystal aligning film is deteriorated due to low adhesive force with the sealant. Specifically, the liquid crystal alignment layer has a problem in that when the liquid crystal discoloration device including the liquid crystal aligning film is manufactured due to the low adhesive force with the sealant, the liquid crystal aligning films are not smoothly adhered to each other, and as a result, the moisture and/or the bubbles are introduced from the outside according to the change in external environment.

On the other hand, in the method for manufacturing a liquid crystal aligning film according to an embodiment of the present invention, a part of the alignment layer is etched by the irradiation of the pulse laser to remove an etching residue of the alignment layer, the sealant may be applied onto the upper portion of the conductive layer in which one area is exposed, and the liquid crystals may be applied to the other area of the alignment layer which is not etched. Accordingly, the blocking property of the moisture and/or the bubbles of the liquid crystal discoloration device formed by inclusion of the liquid crystal aligning film as upper and lower portions and adhesion of the two or more liquid crystal aligning films may enhanced.

According to an embodiment of the present invention, the multilayer structure may include the passivation film provided on the liquid crystal alignment layer. During the process of etching one area of the liquid crystal alignment layer by irradiating the pulse laser, the passivation film may minimize the damage to the conductive layer by the irradiation of the pulse laser and allow the etching residue of the liquid crystal alignment layer provided on the conductive layer to be sufficiently peeled.

Specifically, as described above, since the liquid crystal alignment layer and the conductive layer have thicknesses smaller than the thickness of the substrate, when the pulse laser is irradiated in the process of etching one area of the liquid crystal alignment layer, not only the liquid crystal alignment layer but also the conductive layer are damaged. More specifically, when the liquid crystal aligning film includes the polymer substrate, external moisture and/or bubbles are introduced into the liquid crystals provided on the alignment layer as the conductive layer is damaged.

On the other hand, in the method of manufacturing a liquid crystal aligning film according to an embodiment of the present invention, since the passivation film is provided on the liquid crystal alignment layer, even when one area of the liquid crystal alignment layer is etched through the irradiation of the pulse laser, it is possible to minimize the damage to the conductive layer provided below one area of the etched liquid crystal alignment layer. Further, as the passivation film is provided on the liquid crystal alignment layer, the etching residue of the liquid crystal alignment layer of which one area is etched may be transferred to the passivation film and removed through the irradiation of the pulse laser.

As the method for manufacturing a liquid crystal aligning film in the related art, in order to provide a liquid crystal alignment layer in which one area of the conductive layer is exposed, a method for providing a patterned liquid crystal alignment layer on the conductive layer, a method for removing the passivation film and then, cutting the liquid crystal alignment layer by directly irradiating a laser onto the liquid crystal alignment layer, or a method for melting the liquid crystal alignment layer by using the organic solvent, etc. after removing the passivation film is used.

However, the method in the related art is not compatible with the roll-to-roll scheme continuous process, the conductive layer is damaged, and economical efficiency may not be secured as described above.

Accordingly, in the method for manufacturing a liquid crystal aligning film according to an embodiment of the present invention, the damage to the conductive layer may be minimized by providing the passivation film on the liquid crystal alignment layer and a separate process of removing the etching residue of the liquid crystal alignment layer depending on the irradiation of the pulse laser is not accompanied, thereby securing the economical efficiency in the process.

According to an embodiment of the present invention, light transmittance of the passivation film at a wavelength of 343 nm may be 50% or more and specifically 70% or more. However, the present invention is not limited thereto, and the light transmittance of the passivation film may be approximately adjusted according to a condition of a pulse laser irradiated to the multilayer structure.

According to an embodiment of the present invention, the light transmittance of the passivation film at the wavelength of 343 nm may mean a ratio of a light amount transmitted through the passivation film to a light amount irradiated to the passivation film when the pulse laser having the wavelength of 343 nm is irradiated.

According to an embodiment of the present invention, the passivation film may include at least one of polyethylene terephthalate, polyethylene, polyolefin, and ethylene vinyl acetate.

According to an embodiment of the present invention, the thickness of the passivation film may be 20 μm or more and 60 μm or less, 20 μm or more and 50 μm or less, 30 μm or more and 60 μm or less, 30 μm or more and 50 μm or less, 30 μm or more and 45 μm or less, 35 μm or more and 50 μm or less, or 35 μm or more and 45 μm or less. However, the present invention is not limited thereto, and the thickness of the passivation film may be approximately adjusted according to a condition of a pulse laser irradiated to the multilayer structure.

According to an embodiment of the present invention, since the passivation film has a thickness larger than the thicknesses of the liquid crystal alignment layer and the conductive layer, when the pulse laser for etching the liquid crystal alignment layer is irradiated, the pulse laser may be transmitted through the passivation film having the thickness of the above range and a pulse layer having an energy enough not to damage the conductive layer while enabling etching of the liquid crystal alignment layer may be irradiated.

According to an embodiment of the present invention, the multilayer structure may further include an adhesive layer between the passivation film and the liquid crystal alignment layer. Specifically, as the multilayer structure includes the adhesive layer, the substrate, the conductive layer, the liquid crystal alignment layer, the adhesive layer, and the passivation film may be sequentially provided in the multilayer structure. Further, the adhesive layer may be in contact with an upper surface of the liquid crystal alignment layer and a lower surface of the passivation film. In addition, the pulse laser may be irradiated to a multilayer structure in which the substrate, the conductive layer, the liquid crystal alignment layer, the adhesive layer, and the passivation film are sequentially provided.

According to an embodiment of the present invention, after the pulse laser is irradiated to the adhesive layer, the etching residue of the liquid crystal alignment layer may be removed or peeled from the conductive layer during the process of removing/peeling the passivation film. Specifically, the adhesive layer is in contact with the etching residue of the liquid crystal alignment layer and the passivation film, and as the passivation film is removed/peeled, the etching residue in contact with the adhesive layer may be removed/peeled at the same time.

According to an embodiment of the present invention, the thickness of the adhesive layer may be 5 µm or more and 20 µm or less, 5 µm or more and 15 µm or less, 10 µm or more and 20 µm or less, or 10 µm or more and 15 µm or less. However, the present invention is not limited thereto, and the thickness of the adhesive layer may be approximately adjusted according to the condition of a pulse laser irradiated to the multilayer structure.

According to an embodiment of the present invention, the adhesive layer may include at least one of an acrylic adhesive, a natural rubber adhesive, a synthetic rubber adhesive, and a silicone adhesive.

According to an embodiment of the present invention, the multilayer structure may further include two or more separated spacers between the conductive layer and the liquid crystal alignment layer. Further, the spacer may be impregnated between the conductive layer and the liquid crystal alignment layer. The multilayer structure further includes the spacer so that even if a process for pressing the two or more liquid crystal alignment films is then performed in the process of manufacturing the liquid crystal discoloration device including the liquid crystal alignment film, an interval between the conductive layer and the liquid crystal alignment layer may be maintained constant.

According to an embodiment of the present invention, the spacer may be a bead spacer (B/S) or a column spacer (C/S). Specifically, the bead spacer may mean a spherical spacer in the form of a bead, and the column spacer may mean a spacer in the form of a column.

According to an embodiment of the present invention, when the spacer is the column spacer, the multilayer structure may be in the form in which the substrate, the conductive layer, the column spacer, the liquid crystal alignment layer, and the passivation film are sequentially provided.

Further, when the spacer is the bead spacer, in the liquid crystal alignment layer, the light alignment layer and the rubbing alignment layer may be sequentially provided and the bead spacer may be provided between the light alignment layer and the rubbing alignment layer. That is, when the spacer is the bead spacer, the multilayer structure may be in form in which the substrate, the conductive layer, the light alignment layer, the bead spacer, the rubbing alignment layer, and the passivation film are sequentially provided.

Step of Etching One Area of Liquid Crystal Alignment Layer

According to an embodiment of the present invention, the method for manufacturing the liquid crystal aligning film includes a step of etching one area of the liquid crystal alignment layer by irradiating the pulse laser to the multilayer structure.

According to an embodiment of the present invention, in the step of etching one area of the liquid crystal alignment layer, an etching mask may be provided on the passivation film and then, the pulse laser may be irradiated to an area where the passivation film is exposed by the etching mask. In this specification, the pulse laser may mean a pulse laser known to the art and specifically, mean a pulse type laser, that is, a laser with temporal oscillation and quiescence.

According to an embodiment of the present invention, the pulse laser may be a pico second laser, specifically a pico second pulse laser. In this specification, the pico second laser may mean a laser in which a pulse width is a pico ($10^{-12}$) second unit. Specifically, the pulse width may mean a time interval at which an amplitude becomes half at a rise time and a fall time of the pulse of the pulse laser.

According to an embodiment of the present invention, the wavelength of the pulse laser may be a wavelength of an ultraviolet area, specifically, 10 nm to 400 nm, 10 nm to 100 nm, 100 nm to 280 nm, 280 nm to 320 nm, 320 nm or more and 400 nm or less, or 343 nm. That is, the pulse laser may be a microwave ultraviolet laser.

When the laser of an infrared wavelength is irradiated instead of the microwave ultraviolet laser, not only the liquid crystal alignment layer but also the conductive layer may also be peeled off. Specifically, when the multilayer structure is irradiated with an infrared wavelength, specifically, a long wavelength infrared laser, an interface may be peeled off due to a difference in thermal expansion coefficient between the conductive layer and the substrate.

On the other hand, according to an embodiment of the present invention, by irradiating the multilayer structure with the microwave ultraviolet laser, the conductive layer is not peeled, the damage to the conductive film may be minimized and only the liquid crystal alignment layer may be selectively etched.

According to an embodiment of the present invention, maximum pulse energy of the pulse laser may be 50 µJ or more and 100 µJ or less and the pulse energy of the pulse laser may be 5% or more and 15% or less of the maximum pulse energy. Specifically, the maximum pulse energy of the pulse laser may be 50 µJ or more and 100 µJ or less, 50 µJ or more and 90 µJ or less, 50 µJ or more and 80 µJ or less, 60 µJ or more and 100 µJ or less, 60 µJ or more and 90 µJ or less, 60 µJ or more and 80 µJ or less, 70 µJ or more and 100 µJ or less, 70 µJ or more and 90 µJ or less, 70 µJ or more and 80 µJ or less, or 75 µJ. However, the maximum pulse energy of the pulse laser is not limited to the above range and may be appropriately adjusted according to the thicknesses and/or physical properties of the substrate, the conductive layer, the liquid crystal alignment layer, the adhesive layer, and the passivation film.

Further, according to an embodiment of the present invention, the pulse energy of the pulse laser is 5% or more and 15% or less, 5% or more and 12% or less, 8% or more and 15% or less, or 8% or more and 12% or less of the maximum pulse energy. However, the present invention is not limited thereto and the pulse energy of the pulse laser may be approximately adjusted according to the thicknesses and/or the physical properties of the substrate, the conductive layer, the liquid crystal alignment layer, the adhesive layer, and the passivation film.

According to an embodiment of the present invention, a frequency of the pulse laser is 10 kHz or more and 400 kHz or less, 10 kHz or more and 300 kHz or less, 100 kHz or more and 400 kHz or less, 100 kHz or more and 300 kHz or less, 100 kHz or more and 250 kHz or less, 150 kHz or more and 300 kHz or less, 150 kHz or more and 250 kHz or less, or 200 kHz. However, the present invention is not limited thereto and the frequency may be approximately adjusted according to the thicknesses and/or the physical properties of the substrate, the conductive layer, the liquid crystal alignment layer, the adhesive layer, and the passivation film.

According to an embodiment of the present invention, a spot interval of the pulse laser may be 10 µm or more and 100 µm or less, 10 µm or more and 75 µm or less, 10 µm or more and 50 µm or less, or 10 µm or more and 15 µm or less. However, the present invention is not limited thereto and the spot interval may be approximately adjusted according to the thicknesses and/or the physical properties of the substrate, the conductive layer, the liquid crystal alignment layer, the adhesive layer, and the passivation film.

In this specification, the spot interval of the pulse laser may mean a distance between points where the pulse laser is irradiated. However, the present invention is not limited thereto and the spot interval may be approximately adjusted according to the thicknesses and/or the physical properties of the substrate, the conductive layer, the liquid crystal alignment layer, the adhesive layer, and the passivation film.

According to an embodiment of the present invention, an irradiation speed of the pulse laser is 0.1 m/s or more and 10 m/s or less, 0.1 m/s or more and 7 m/s or less, 0.5 m/s or more and 10 m/s or less, 0.5 m/s or more and 7 m/s or less, 0.5 m/s or more and 5 m/s or less, 1 m/s or more and 7 m/s or less, 1 m/s or more and 5 m/s or less, or 3.5 m/s. However, the present invention is not limited thereto and the irradiation speed may be approximately adjusted according to the thicknesses and/or the physical properties of the substrate, the conductive layer, the liquid crystal alignment layer, the adhesive layer, and the passivation film.

According to an embodiment of the present invention, the pulse laser may be irradiated to the liquid crystal alignment layer from the passivation film. Further, the pulse laser may be irradiated with focus on the surface of the liquid crystal alignment layer adjacent to the passivation film. The pulse laser is irradiated with focus on the surface of the liquid crystal alignment layer adjacent to the passivation film and the pulse laser may be irradiated through the passivation film, thereby preventing the damage to the conductive layer.

Specifically, the pulse energy may be filtered by the passivation film depending on a focus on which the pulse laser is irradiated and the liquid crystal alignment layer may be etched by a pulse laser having filtered pulse energy. Further, the liquid crystal alignment layer to which the pulse laser is irradiated may be uniformly etched, thereby minimizing the damage to the conductive layer.

Further, the pulse laser is not irradiated to a multilayer structure without the passivation film or a multilayer structure from which the passivation film is removed and may be irradiated to the multilayer structure including the passivation film and the passivation film may be removed after the pulse laser is irradiated to the multilayer structure. When the pulse laser is irradiated to the multilayer structure from which the passivation film is removed, a problem in which the liquid crystal alignment layer and the conductive layer are damaged by the irradiation of the pulse laser may occur.

According to an embodiment of the present invention, the pulse laser may be irradiated over the entirety of one area of the liquid crystal alignment layer to be etched, rather than at both ends of one area of the liquid crystal alignment layer to be etched.

When the pulse laser is irradiated only to both ends of one area of the liquid crystal alignment layer and cuts the liquid crystal alignment layer, the pulse laser needs to be irradiated through both the passivation film and the liquid crystal alignment layer in order to remove one area of the liquid crystal alignment layer and when the pulse laser is irradiated through the liquid crystal alignment layer, a problem in which the conductive layer is damaged may occur. Further, when the pulse laser is irradiated only on both ends of one area of the liquid crystal alignment layer, a separate process for removing the residues of the liquid crystal alignment layer is required, so that a problem in which a manufacturing process of the liquid crystal discoloration device including the liquid crystal alignment film is complicated may occur.

On the other hand, in the case of irradiating the entirety of one area of the liquid crystal alignment layer to be etched with the pulse laser as in an embodiment of the present invention, the pulse laser may etch one area of the liquid crystal alignment layer without transmitting the pulse laser through the liquid crystal alignment film and the etching residue of the liquid crystal alignment layer may be peeled or removed together with peeling or removal of the passivation film, so that the manufacturing process of the liquid crystal discoloration device including the liquid crystal alignment film may be simplified.

Step of Exposing One Area of Conductive Layer

According to an embodiment of the present invention, the method for manufacturing a liquid crystal alignment film includes removing the passivation film to expose one area of the conductive film. One area of the conductive layer is exposed, and as a result, a liquid crystal alignment layer having an area from which the etching residue of the liquid crystal alignment layer is removed may be provided.

Specifically, in the liquid crystal alignment film, the substrate, the conductive layer, and the liquid crystal alignment layer having an area in which the conductive layer is exposed may be sequentially provided by exposing one area of the conductive film. Further, the liquid crystal alignment layer may include an area from which the etching residue of the liquid crystal alignment layer etched by the irradiation of the pulse laser is removed.

According to an embodiment of the present invention, the step of exposing one area of the conductive layer may be performed by removing the passivation film together with the residue of the liquid crystal alignment layer etched by the irradiation of the pulse laser.

Specifically, the step of exposing one area of the conductive layer may be performed by etching the liquid crystal alignment layer by the irradiation of the pulse laser and removing the passivation film together with the residue of the liquid crystal alignment layer which is in contact with the adhesive layer. As a result, one area of the conductive layer from which the etching residue of the liquid crystal alignment layer is removed may be exposed to the outside.

According to an embodiment of the present invention, in the process of manufacturing the liquid crystal discoloration device including the liquid crystal aligning film, the sealant may be applied onto one area of the conductive layer exposed to the outside.

As described above, since the conductive layer has better adhesive force with the sealant than the liquid crystal alignment layer, excellent moisture and/or bubble blocking characteristics of the liquid crystal discoloration device manufactured by adhesion of two or more of the liquid crystal aligning films may be implemented.

Further, the liquid crystals may be applied onto the liquid crystal alignment layer in which the conductive layer is not exposed.

FIG. 1 is a schematic view of a method for manufacturing a liquid crystal aligning film according to an embodiment of the present invention. Referring to FIG. 1(a), a multilayer structure 100 in which a substrate 10, a conductive layer 20, a liquid crystal alignment layer 30, and a passivation film 40 are sequentially provided is prepared and the multilayer structure 100 may be irradiated with a pulse laser 200. Specifically, the pulse laser 200 may be transmitted through the passivation film 40 and irradiated with focus on the surface of the liquid crystal alignment layer 30 adjacent to the passivation film 40. An etched portion 31 of the liquid crystal alignment layer may be formed by irradiation of the pulse laser 200.

Further, according to FIG. 1(a), the liquid crystal alignment layer etched portion 31 contacted with the passivation film 40 and formed by the pulse laser 200 may be removed from the multilayer structure 100 in contact with the passivation film 40 at the time of removing or peeling the passivation film 40.

As a result, the liquid crystal aligning film 110 according to an embodiment of the present invention may be in a form in which the substrate 10, the conductive layer 20, and the liquid crystal alignment layer 30 having an area in which the conductive layer 20 is exposed are sequentially provided.

FIG. 2 is a plan view of a liquid crystal aligning film according to an embodiment of the present invention. However, FIG. 2 is just one example among various examples of the present invention and the liquid crystal aligning film of the present invention is not limited to the liquid crystal aligning film illustrated in FIG. 2.

According to FIG. 2, a relatively bright area indicates the liquid crystal alignment layer and a relatively dark area indicates one area in which an etching residue of the liquid crystal alignment layer is removed and the conductive layer is exposed.

A digital camera image of some steps of the method for manufacturing a liquid crystal aligning film according to an embodiment of the present invention is illustrated in FIG. 3.

FIG. 3(a) illustrates a digital camera image of a multilayer structure in which a pulse laser is irradiated and a passivation film is not removed, FIG. 3(b) illustrates a digital camera image of a process of removing the passivation film, and FIG. 3(c) illustrates a digital camera image of the multilayer structure and the passivation film after removal of the passivation film.

Further, in FIG. 3, a portion expressed by an arrow (→) indicates one area of the liquid crystal alignment layer etched by the irradiation of the pulse laser.

According to FIG. 3, it can be seen that in the liquid crystal aligning film manufactured according to the method for manufacturing a liquid crystal aligning film according to an embodiment of the present invention, the etching residue of the liquid crystal alignment layer etched by the irradiation of the laser is removed in contact with the passivation film.

The liquid crystal aligning film manufactured according to an embodiment of the present invention may be used as a film for a liquid crystal discoloration device.

An embodiment of the present invention provides the liquid crystal aligning film. Specifically, in the liquid crystal aligning film, the substrate, the conductive layer, and the liquid crystal alignment layer having an area in which the conductive layer is exposed may be sequentially provided. Further, the liquid crystal aligning film may be manufactured by the method for manufacturing the liquid crystal aligning film. In addition, the liquid crystal aligning film may be applied to the film for the liquid crystal discoloration device.

Each of the substrate, the conductive layer, and the liquid crystal alignment layer of the liquid crystal alignment film according to an embodiment of the present invention may be the same as the substrate, the conductive layer, and the liquid crystal alignment layer in the method for manufacturing a liquid crystal aligning film.

An embodiment of the present invention provides a method for manufacturing a liquid crystal discoloration device including the liquid crystal aligning film. Specifically, an embodiment of the present invention provides a method for manufacturing a liquid crystal discoloration device, which includes: preparing the liquid crystal aligning film as an upper film and a lower film; applying a sealant onto a conductive layer in which one area of the lower film is exposed; applying a liquid crystal onto a liquid crystal alignment layer in which one area of the lower film is not removed; and providing the upper film on the lower film and bonding the lower film and the upper film.

According to an embodiment of the present invention, the sealant and the liquid crystal as a sealant and a liquid crystal, respectively may be selected from general sealants and liquid crystals known in the art and types thereof are not limited/confined.

FIG. 4 is a schematic view of a method for manufacturing a liquid crystal discoloration device according to an embodiment of the present invention.

According to FIG. 4, the liquid crystal discoloration device is manufactured by preparing the liquid crystal aligning film according to an embodiment of the present invention as an upper film and a lower film, applying the sealant onto a conductive layer in which one area of the lower film is exposed and the liquid crystal onto a liquid crystal alignment layer in which one area of a conductive layer of the lower film is not removed, and bonding the lower film and the upper film to each other.

EXPLANATION OF REFERENCE NUMERALS AND SYMBOLS

10: Substrate
20: Conductive layer
30: Liquid crystal alignment layer
31: Liquid crystal alignment layer etched portion
40: Passivation film
100: Multilayer structure
110: Liquid crystal aligning film
200: Pulse laser

MODE FOR INVENTION

Hereinafter, the present invention will be described in detail with reference to examples for a specific description. However, the examples according to the present invention may be modified in various forms, and it is not interpreted that the scope of the present invention is limited to the examples described below. The examples of this specification will be provided for more completely explaining the present invention to those skilled in the art.

Preparation Example—Preparation of Multilayer Structure

Preparation Example 1—Clear Specimen

A multilayer structure was prepared in which a substrate, a conductive layer, a rubbing alignment layer, an adhesive layer, and a passivation film were sequentially provided.

Preparation Example 2—C/S Specimen

A multilayer structure was prepared in which the substrate, the conductive layer, a column spacer, the rubbing alignment layer, the adhesive layer, and the passivation film were sequentially provided.

Preparation Example 3—B/S Specimen

A multilayer structure was prepared in which the substrate, the conductive layer, a light alignment layer, a bead spacer, the rubbing alignment layer, the adhesive layer, and the passivation film were sequentially provided.

Specific information of Preparation Examples 1 to 3 is shown in Table 1 below.

TABLE 1

|  | Substrate | Conductive layer | Light alignment layer | Spacer | Rubbing alignment layer | Adhesive layer | Passivation film |
|---|---|---|---|---|---|---|---|
| Preparation Example 1 | COP 100 μM | ITO 40 to 70 nm | — | — | PI 0.1 μm | Acrylic adhesive layer 12 μm | PET 38 μm |
| Preparation Example 2 | PC 100 μm | ITO 40 to 70 nm | — | Column spacer | PI 0.1 μm | Acrylic adhesive layer 12 μm | PET 38 μm |
| Preparation Example 3 | PC 100 μm | ITO 40 to 70 nm | Cinnamate Acrylate | Bead spacer | PI 0.1 μm | Acrylic adhesive layer 12 μm | PET 38 μm |

\* COP: Cyclo Olefin Polymer
\* PC: Polycarbonate
\* ITO: Indium Tin Oxide
\* PI: Polyimide
\* PET: Polyethylene Terephthalate Examples 1-1 to 3-4—Laser Irradiation after Non-Removal of Passivation Film A pulse laser having information shown in Table 2 below was irradiated to the multilayer structure of any one of Preparation Examples 1 to 3 focusing on the rubbing alignment layer in contact with the passivation film toward the rubbing alignment layer from the passivation film while adjusting pulse energy of the pulse laser and the rubbing alignment layer was etched.

A liquid crystal aligning film was prepared by peeling the passivation film of the multilayer structure in which the rubbing alignment layer is etched.

TABLE 2

| Pulse laser irradiation equipment | Trumicro 5050, Trumpf, picosecond laser |
|---|---|
| Maximum pulse energy (μJ) | 75 |
| Wavelength (nm) | 343 |
| Frequency (kHz) | 200 |
| Etching interval (μm) | 15 |
| Irradiation speed (m/s) | 3.5 |
| Focal distance | 160 |

Specific information of Examples 1-1 to 3-4 is shown in Table 3 below.

TABLE 3

|  | Multilayer structure | Pulse energy |
|---|---|---|
| Example 1-1 | Preparation Example 1 | 8% of maximum pulse energy |
| Example 1-2 | Preparation Example 1 | 9% of maximum pulse energy |
| Example 1-3 | Preparation Example 1 | 10% of maximum pulse energy |
| Example 1-4 | Preparation Example 1 | 11% of maximum pulse energy |
| Example 2-1 | Preparation Example 2 | 10% of maximum pulse energy |
| Example 2-2 | Preparation Example 2 | 11% of maximum pulse energy |
| Example 2-3 | Preparation Example 2 | 12% of maximum pulse energy |
| Example 3-1 | Preparation Example 3 | 8% of maximum pulse energy |
| Example 3-2 | Preparation Example 3 | 9% of maximum pulse energy |
| Example 3-3 | Preparation Example 3 | 10% of maximum pulse energy |
| Example 3-4 | Preparation Example 3 | 11% of maximum pulse energy |

Comparative Examples 1-1 to 3-4—Laser Irradiation after Removal of Passivation Film The passivation film of the multilayer structure of any one of Preparation Examples 1 to 3 was removed and the pulse laser having the information shown in Table 2 above was irradiated to directly focus on the rubbing alignment layer by adjusting pulse energy.

After the pulse laser was irradiated, an alignment residue was removed by using an adhesive tape (made by 3M) which was commercially available.

Specific information of Comparative Examples 1-1 to 3-4 is shown in Table 4 below.

TABLE 4

|  | Multilayer structure | Pulse energy |
|---|---|---|
| Comparative Example 1-1 | Preparation Example 1 | 6% of maximum pulse energy |
| Comparative Example 1-2 | Preparation Example 1 | 7% of maximum pulse energy |
| Comparative Example 1-3 | Preparation Example 1 | 8% of maximum pulse energy |
| Comparative Example 1-4 | Preparation Example 1 | 9% of maximum pulse energy |
| Comparative Example 2-1 | Preparation Example 2 | 6% of maximum pulse energy |
| Comparative Example 2-2 | Preparation Example 2 | 7% of maximum pulse energy |
| Comparative Example 2-3 | Preparation Example 2 | 8% of maximum pulse energy |
| Comparative Example 2-4 | Preparation Example 2 | 9% of maximum pulse energy |
| Comparative Example 3-1 | Preparation Example 3 | 6% of maximum pulse energy |
| Comparative Example 3-2 | Preparation Example 3 | 7% of maximum pulse energy |
| Comparative Example 3-3 | Preparation Example 3 | 8% of maximum pulse energy |
| Comparative Example 3-4 | Preparation Example 3 | 9% of maximum pulse energy |

Comparative Example 4—Removal of Passivation Film and Irradiation of Infrared Wavelength Laser The passivation film of another multilayer structure in Preparation Example 3 was removed and the pulse laser of the infrared wavelength shown in Table 5 below was irradiated directly to focus on the rubbing alignment layer and the etching residue of the alignment layer was removed by using toluene to prepare the liquid crystal aligning film.

TABLE 5

| Laser irradiation equipment | redENERGY G4, SPI Laser |
|---|---|
| Output (W) | 50 |
| Wavelength (nm) | 1064 |
| Frequency (kHz) | 40 |
| Irradiation speed (mm/s) | 2,000 |
| Spot size (μm) | 40 |
| Etching interval (μm) | 38 |
| Overlap (%) | 25 |

Experimental Example 1—Evaluating Whether Alignment Layer Residue is Transferred to Passivation Film The surface of the conductive layer of the liquid crystal aligning film according to Examples 1-1 to 1-3, Examples 2-1 to 2-3, and Examples 3-1 to 3-3 and a bonding surface of the passivation film onto the multilayer structure were photographed using an optical microscope (BX51M, Olympus) and the optical microscope images are shown in FIGS. 5 to 7.

FIG. 5 illustrates an optical microscope image of the surface of a conductive layer and a bonding surface of a passivation film according to Examples 1-1 to 1-3.

Specifically, FIGS. 5(a) and 5(b) illustrate optical microscope images of the surface of the conductive layer and the bonding surface of the passivation film according to Example 1-1, respectively, FIGS. 5(c) and 5(d) illustrate optical microscope images of the surface of the conductive layer and the bonding surface of the passivation film according to Example 1-2, respectively and FIGS. 5(e) and 5(f) illustrate optical microscope images of the surface of the conductive layer and the bonding surface of the passivation film according to Example 1-3, respectively.

In FIG. 5, an area expressed by an arrow (→) indicates the etching residue of the rubbing alignment layer etched by the irradiation of the pulse laser and transferred to the passivation film.

Specifically, it can be seen that the etching residue of the rubbing alignment layer etched in FIGS. 5(a), 5(c), and 5(e) are transferred to the bonding surface of the passivation film according to FIGS. 5(b), 5(d), and 5(f).

According to FIG. 5, there is a difference in etching degree as the pulse energy of the pulse laser increases, but it can be seen that the etching residue of the rubbing alignment layer of the multilayer structure is transferred to the surface of the passivation film and as a pattern of the surface of the conductive layer is uniformly maintained, it can be seen that the damage to the conductive layer is minimized even by the irradiation of the pulse laser.

FIG. 6 illustrates an optical microscope image of the surface of a conductive layer and a bonding surface of a passivation film according to Examples 2-1 to 2-3.

Specifically, FIGS. 6(a) and 6(b) illustrate optical microscope images of the surface of the conductive layer and the bonding surface of the passivation film according to Example 2-1, respectively, FIGS. 6(c) and 6(d) illustrate optical microscope images of the surface of the conductive layer and the bonding surface of the passivation film according to Example 2-2, respectively and FIGS. 6(e) and 6(f) illustrate optical microscope images of the surface of the conductive layer and the bonding surface of the passivation film according to Example 2-3, respectively.

In FIG. 6, an area expressed by an arrow (→) indicates the etching residue of the rubbing alignment layer etched by the irradiation of the pulse laser and transferred to the passivation film. Further, in FIG. 6, an area expressed by a circle corresponds to a column spacer.

According to FIGS. 6(a), 6(c), and 6(e), it could be seen that there was a difference in etching degree as the pulse energy of the pulse laser increased, but the etching residue of the rubbing alignment layer of the multilayer structure was transferred to the surface of the passivation film. Further, it could be seen that a part corresponding to the etching residue was transferred to the bonding surface of the passivation film according to FIGS. 6(b), 6(d), and 6(f).

Furthermore, according to FIG. 6, it could be seen that an area adjacent to the column spacer of the rubbing alignment layer was not in contact with the passivation film and the etching residue of the liquid crystal alignment layer was not transferred to the passivation film even though the passivation film was peeled. However, it could be seen that as the pattern of the surface of the conductive layer is uniformly maintained, the damage to the conductive layer is minimized even by the irradiation of the pulse laser.

FIG. 7 illustrates an optical microscope image of the surface of a conductive layer and a bonding surface of a passivation film according to Examples 3-1 to 3-3.

Specifically, FIGS. 7(a) and 7(b) illustrate optical microscope images of the surface of the conductive layer and the bonding surface of the passivation film according to Example 3-1, respectively, FIGS. 7(c) and 7(d) illustrate optical microscope images of the surface of the conductive layer and the bonding surface of the passivation film according to Example 3-2, respectively and FIGS. 7(e) and 7(f) illustrate optical microscope images of the surface of the conductive layer and the bonding surface of the passivation film according to Example 3-3, respectively.

In FIG. 7, an area expressed by an arrow (→) indicates the etching residues of the rubbing alignment layer and the light alignment layer etched by the irradiation of the pulse laser and transferred to the passivation film. Further, in FIG. 7, an area expressed by a dark circle corresponds to the bead spacer.

According to FIGS. 7(a), 7(c), and 7(e), it could be seen that the light alignment layer above the conductive layer and the alignment layer above the bead spacer are simultaneously peeled by considering that the area etched by the irradiation of the pulse laser and transferred to the passivation film does not coincide with the area to which the pulse laser is irradiated.

Further, it could be seen that the etching residue by irradiation of the pulse laser was transferred to the passivation film according to FIGS. 7(b), 7(d), and 7(f).

When contents for FIGS. 5 to 7 are integrated, it could be seen that in the case of irradiating the pulse laser without removing the passivation film, the damage to the conductive layer may be minimized and the liquid crystal alignment layer may be partially etched and even though a separate spacer is provided between the liquid crystal alignment layer and the conductive layer, the same is applied. Further, it could be seen that the residue of the liquid crystal alignment layer by the partial etching of the liquid crystal alignment layer may be transferred to the passivation film and peeled.

Experimental Example 2—Evaluating Whether Conductive Surface of Comparative Example is Damaged The surface of the conductive layer of the liquid crystal aligning film according to Comparative Examples 1-2 to 1-4, Comparative Examples 2-3 to 2-4, and 3-1 to 3-4 was photographed using an optical microscope (BX51M, Olympus) and the optical microscope images are shown in FIGS. 8 to 10.

The optical microscope image of the surface of the conductive layer of the liquid crystal aligning film according to Comparative Examples 1-2 to 1-4 is illustrated in FIG. 8.

Specifically, FIGS. 8(a), 8(b), and 8(c) illustrate optical microscope images of the surface of the conductive layer of the liquid crystal aligning film according to Comparative Examples 1-2, 1-3, and 1-4, respectively. In each of FIGS. 8(a), 8(b), and 8(c), based on a center line, an upper portion indicates an area in which the rubbing alignment layer is not etched and a lower portion indicates an area in which the rubbing alignment layer is etched.

Further, in FIG. 8, it could be seen that the surface of the conductive layer to which the pulse laser is irradiated is damaged through the area expressed by the arrow (→).

According to FIG. 8, it could be seen that there was a difference in degree depending on the pulse energy of the irradiated pulse laser, but the conductive layer is damaged due to the irradiation of the pulse laser through an area expressed by a relatively dark point below the center line.

In particular, by considering that the etching residue of the liquid crystal alignment layer of a right center illustrated in FIG. 8(c) protrudes to the lower portion, it could be seen that a problem occurs in which the etching residue is not normally removed even by using the adhesive tape after irradiating the pulse laser when the passivation film is removed before the irradiation of the pulse laser.

The optical microscope image of the surface of the conductive layer of the liquid crystal aligning film according to Comparative Examples 2-3 to 2-4 is illustrated in FIG. 9.

Specifically, FIGS. 9A and 9B illustrate optical microscope images of the surface of the conductive layer of the liquid crystal aligning film according to Comparative Examples 2-3 and 2-4, respectively. In each of FIGS. 9(a) and 9(b), based on the center line, the upper portion indicates an area in which the rubbing alignment layer is not etched and the lower portion indicates an area in which the rubbing alignment layer is etched.

Further, in FIG. 9, it could be seen that the surface of the conductive layer to which the pulse laser is irradiated is damaged through the area expressed by the arrow (→).

In particular, by considering that the area corresponding to the column spacer shown in a lower right portion of FIG. 9(b), it could be seen that the conductive layer is damaged when removing the passivation film and directly irradiating the laser to the surface of the liquid crystal alignment layer regardless of a shape of the multilayer structure.

The optical microscope image of the surface of the conductive layer of the liquid crystal aligning film according to Comparative Examples 3-1 to 3-4 is illustrated in FIG. 10.

Specifically, FIGS. 10(a), 10(b), 10(c), and 10(d) illustrate optical microscope images of the surface of the conductive layer of the liquid crystal aligning film according to Comparative Examples 3-1, 3-2, 3-3, and 3-4, respectively.

In each of FIGS. 10(a) to 10(d), based on the center line, the upper portion indicates an area in which the pulse laser is irradiated and the lower portion indicates an area in which the pulse laser is not irradiated.

According to FIGS. 10(a) to 10(d), by considering that the area in which the liquid crystal alignment layer is removed and the area to which the pulse laser is irradiated do not coincide with each other, it could be seen that the rubbing alignment layer and the light alignment layer are simultaneously removed.

Further, in FIG. 10, it could be seen that there is a difference in degree, but the surface of the conductive layer to which the pulse laser is irradiated is damaged through the area expressed by the arrow (→).

Further, although not illustrated in FIG. 10, even though a separate bead spacer is provided, when the passivation film is removed and the laser is directly irradiated onto the surface of the liquid crystal alignment layer, it could be seen that the conductive layer is damaged.

When the contents of FIGS. 8 to 10 are integrated, through the portions expressed by the arrows in FIGS. 8 to 10, it could be seen that in the case of removing the passivation film and then, irradiating the pulse laser, the conductive layer is damaged by the irradiation of the pulse laser regardless of the type of multilayer structure to which the pulse laser is irradiated.

Hereinafter, in order to more specifically show the degree of the damage to the conductive layer, contents regarding an experiment that quantify the damage degree will be described.

Experimental Example 3-4—Probe Measurement Method

Sheet resistance was measured by using four probes on the surface of the conductive layer of the liquid crystal aligning film according to each of Comparative Examples 1-1 to 1-4, Comparative Examples 2-1 to 2-4, and Comparative Examples 3-1 to 3-4 and an average value of three measurement values are shown in Table 6 below.

TABLE 6

| Classification | Sheet resistance (Ω/sq) |
| --- | --- |
| Comparative Example 1-1 | 253.0 |
| Comparative Example 1-2 | 506.8 |
| Comparative Example 1-3 | 690.4 |
| Comparative Example 1-4 | 1025.6 |
| Comparative Example 2-1 | 148.1 |
| Comparative Example 2-2 | 141.7 |
| Comparative Example 2-3 | 168.9 |
| Comparative Example 2-4 | 229.4 |
| Comparative Example 3-1 | 241.5 |
| Comparative Example 3-2 | 242.6 |
| Comparative Example 3-3 | 505.2 |
| Comparative Example 3-4 | 753.3 |

Specifically, the larger the sheet resistance value, the greater the degree of the damage to the conductive film.

According to Table 6 above, it could be seen that as the pulse energy of the pulse laser to be irradiated increases, the sheet resistance value increases, and thus the degree of the damage of the conductive film increases with an increase in pulse energy of the pulse laser to be irradiated.

In addition, it was seen that the degree of the damage to the conductive film was different according to the type of multilayer structure to which the pulse laser was irradiated (Preparation Examples 1 to 3).

When the contents are integrated, in the case of removing the passivation film before irradiating the pulse laser, the conductive layer is damaged and the degree of damage to the conductive film increases as the pulse energy of the pulse laser to be irradiated increases and it could be seen that the degree of the damage to the conductive layer was different depending on the type of multilayer structure to which the pulse laser is irradiated.

Specifically, it could be seen that the degree of the damage of the conductive film increases in order of a case where the pulse laser having the same pulse energy is irradiated, a case where the column spacer is provided, a case where the bead spacer is provided, and a case where the spacer is not provided.

Hereinafter, the evaluation of durability at high temperature and high humidity to show that the damage of the conductive film is minimized when the pulse laser is irradiated without removing the passivation film will be described.

Experimental Example 4—Evaluation of Durability at High Temperature and High Humidity Two liquid crystal aligning films were prepared according to each of Example 1-4, Example 3-4, and Comparative Example 4.

The two liquid crystal aligning films were set as the upper film and the lower film, respectively, and the sealant was applied to a portion where the conductive layer of the lower film is exposed and the liquid crystal was applied to a portion of the liquid crystal alignment layer where the conductive layer is not exposed.

The upper film was provided on the lower film to which the sealant and the liquid crystal were applied and the upper film and the lower film were bonded to each other to prepare a specimen.

FIG. 11 illustrates a schematic view of the specimen used in the experiment and a digital camera image thereof.

FIG. 11(a) is a schematic view of the specimen and FIG. 11(b) illustrate digital camera images of the specimen according to Examples 1-4 and 3-4.

In FIG. 11(a), a portion expressed by the arrow corresponds to an area where the liquid crystal alignment layer is etched by the pulse laser.

The specimens according to Examples 1-4 and 3-4 were left for approximately 70 hours under a condition of a temperature of 60° C. and relative humidity of 90% and the specimen according to Comparative Example 4 was left for approximately 300 hours under a condition of a temperature of 60° C. and relatively humidity of 90% and a high-temperature and high-humidity durability experiment was performed.

FIG. 12 illustrates a digital camera image of a high temperature/high humidity durability experiment evaluation result of Examples 1-4 and 3-4. Specifically, FIG. 12A and FIG. 12B illustrate digital camera images of the high temperature/high humidity durability experiment evaluation result of Examples 1-4 and 3-4, respectively.

According to FIG. 12, in the case of the specimen prepared by using the liquid crystal aligning film manufactured according to an embodiment of the present invention, it could be seen that the bubble is not generated even under the high-temperature and high-humidity condition.

FIG. 13 illustrates a digital camera image before/after evaluating the specimen for evaluating the high-temperature and high-humidity durability experiment of Comparative Example 4. Specifically, FIGS. 13(a) and 13(b) illustrate the digital camera images before and after evaluating the specimen for evaluating the high-temperature and high-humidity durability experiment of Comparative Example 4, respectively.

Meanwhile, according to FIG. 13, in the case of the specimen prepared by removing the passivation film and then, irradiating the laser and using the liquid crystal aligning film of Comparative Example 4 in which the laser is an infrared long-wavelength laser, it could be seen that the bubble is generated under the high-temperature and high-humidity condition.

When the contents are integrated, since the bubble is generated when the conductive layer having a bubble blocking characteristic is damaged, it could be seen that the damage to the conductive layer of the liquid crystal aligning film manufactured according to an embodiment of the present invention is minimized.

That is, through the contents, it could be seen that only when a pico second unit microwave ultraviolet laser is irradiated to focus on the surface of the liquid crystal alignment layer adjacent to the passivation film without removing the passivation film, the liquid crystal aligning film in which the damage to the conductive layer is minimized may be manufactured.

Further, it could be seen that in the case of the liquid crystal discoloration device including the liquid crystal aligning film manufactured thereby, the damage to the conductive layer is minimized by blocking the introduction of the moisture and/or bubbles due to a change in external environment even under the high-temperature and high-humidity condition.

The invention claimed is:

1. A method for manufacturing a liquid crystal aligning film comprising:
    preparing a multilayer structure in which a substrate, a conductive layer, a liquid crystal alignment layer, and a passivation film are sequentially provided, wherein the passivation film is in direct contact with the liquid crystal alignment layer and is at least one of polyethylene terephthalate, polyethylene, polyolefin, or ethylene vinyl acetate;
    etching one area of the liquid crystal alignment layer by irradiating a pulse laser to the multilayer structure; and
    exposing one area of the conductive layer on the substrate by removing the passivation film with a portion of the liquid crystal alignment layer,
    wherein the pulse laser is irradiated to the liquid crystal alignment layer from the passivation film and a maximum pulse energy of the pulse laser is 50 µJ or more per pulse and 100 µJ or less per pulse.

2. The method of claim 1, wherein the substrate is a polymer substrate.

3. The method of claim 1, wherein light transmittance of the passivation film at a wavelength of 343 nm is 50% or more.

4. The method of claim 1, wherein the exposing of one area of the conductive layer is performed by removing the passivation film together with a residue of the liquid crystal alignment layer etched by irradiation of the pulse laser.

5. The method of claim 1, wherein the multilayer structure further includes two or more separated spacers.

6. The method of claim 5, wherein the spacer is a column spacer or a bead spacer.

7. The method of claim 1, wherein the pulse laser is irradiated with focus on a surface of the liquid crystal alignment layer adjacent to the passivation film.

8. The method of claim 1, wherein the pulse laser is a pico second laser.

9. The method of claim 1, wherein
a pulse energy of the pulse laser irradiating on the liquid crystal alignment layer is in a range of 5% or more to 15% or less of the maximum pulse energy.

10. The method of claim 1, wherein a frequency of the pulse laser is 10 kHz or more and 400 kHz or less.

11. The method of claim 1, wherein a spot interval of the pulse laser is 10 μm or more and 100 μm or less.

12. The method of claim 1, wherein an irradiation speed of the pulse laser is 0.1 m/s or more and 10 m/s or less.

* * * * *